(12) United States Patent
Datta et al.

(10) Patent No.: US 7,359,223 B2
(45) Date of Patent: Apr. 15, 2008

(54) POWER CONVERTER SYSTEM AND METHOD

(75) Inventors: Rajib Datta, Niskayuna, NY (US); Kunlun Chen, Shanghai (CN); Haiqing Weng, Shanghai (CN); Ravisekhar Nadimpalli Raju, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 76 days.

(21) Appl. No.: 11/095,227

(22) Filed: Mar. 30, 2005

(65) Prior Publication Data

US 2006/0227578 A1    Oct. 12, 2006

(51) Int. Cl.
    *H02M 7/00*    (2006.01)
(52) U.S. Cl. .................... 363/71; 363/37; 363/65
(58) Field of Classification Search ............ 363/71–72, 363/53–56, 48, 65, 15–20, 64, 35, 49, 51, 363/37–41, 70, 95, 98; 323/355, 207, 361; 307/54, 64, 66, 58; 318/759, 798, 377, 807
See application file for complete search history.

(56) References Cited

U.S. PATENT DOCUMENTS

| 5,339,235 | A |   | 8/1994  | Shekhawat et al. |
| 5,625,545 | A |   | 4/1997  | Hammond et al. |
| 5,729,121 | A | * | 3/1998  | Coenders et al. ............ 323/361 |
| 5,986,909 | A | * | 11/1999 | Hammond et al. ........... 363/65 |
| 5,999,427 | A | * | 12/1999 | Dahler et al. ................. 363/71 |
| 6,198,178 | B1|   | 3/2001  | Schienbein et al. |
| 6,400,585 | B2| * | 6/2002  | Jiang-Hafner ................ 363/35 |
| 6,768,223 | B2| * | 7/2004  | Powell et al. ................. 307/64 |

FOREIGN PATENT DOCUMENTS

EP    0390184 B1    2/1993

OTHER PUBLICATIONS

International Search Report dated Jul. 31, 2006.

* cited by examiner

*Primary Examiner*—Rajnikant B. Patel
(74) *Attorney, Agent, or Firm*—Ann M. Agosti; Patrick K. Patnode

(57) ABSTRACT

A power converter system for supplying an output voltage is provided. The power converter system is adapted to operate in a normal mode and a fault mode. The system comprises a plurality of bridges and a plurality of transformers. The system further comprises a plurality of dc link capacitors, each coupled across a corresponding bridge. The system also includes a controller adapted for, during the normal mode, switching each bridge with a respective normal phase shift. During the fault mode, the controller is adapted for switching each of the remaining ones of the bridges with a respective adjusted phase shift to generate the output voltage. During the fault mode, at least one of the plurality of bridges is bypassed.

19 Claims, 3 Drawing Sheets

POWER CONVERTER SYSTEM AND METHOD

BACKGROUND

The invention relates generally to power converter systems and more specifically to a method and system for operating a power converter system in a normal mode and a failure mode.

Many devices, such as power supply systems, include power converter systems. A power converter system is typically used to convert an input voltage, which may be fixed frequency, variable frequency, or dc to a desired converter output voltage. The output voltage and frequency may be fixed or variable. A converter system usually includes several switches such as insulated gate bipolar transistors (IGBTs) that are switched at certain frequencies to generate the desired converter output voltage and frequency. The converter output voltage is then provided to various loads via transformers. Loads as used herein are intended to broadly include motors, power grids, and resistive loads, for example.

In several applications such as wind power generation and industrial power generation, for example, power converter systems typically include several components like bridges and transformers. A single point failure in such converter systems may lead to the shutting down of the entire power converter system, thereby lowering availability. It is therefore desirable to design a power converter system with higher availability.

In a situation where a component in the power converter system fails, the converter output voltage is not of high quality. That is, the converter output voltage may include harmonic components. Thus, it is desirable to maintain harmonic components in the converter output voltage at a minimum level, even when a single point failure occurs.

Therefore, what is desired is a power converter system that is capable of operating when a component in the system fails while maintaining a high quality output voltage with minimum harmonic components.

BRIEF DESCRIPTION

Briefly, according to one embodiment of the invention, a power converter system for supplying an output voltage is provided. The power converter system is adapted to operate in a normal mode and a fault mode. The system comprises a plurality of bridges and a plurality of transformers. Each bridge is coupled to a primary winding of a corresponding transformer, and the secondary windings of the transformers are coupled together. The system further comprises a plurality of dc link capacitors, each coupled across a corresponding bridge. The system further comprises a controller adapted for, during the normal mode, switching each bridge with a respective normal phase shift, and, during the fault mode, bypassing at least one faulty bridge and switching each of the remaining bridges with a respective adjusted phase shift to generate the output voltage.

In another embodiment, a method for supplying an output voltage using a power converter system is provided. The power converter system comprises bridges, transformers, and dc link capacitors with each bridge being coupled to a respective transformer and a respective dc link capacitor coupled thereacross. The method comprises operating in a normal mode, by switching each of the bridges with a respective normal phase shift. The method further comprises operating in a fault mode, wherein at least one of the plurality of bridges is bypassed and the remaining bridges are each configured for being switched with an adjusted phase shift to generate the output voltage.

In another embodiment, a power converter system for supplying an output voltage is provided. The power converter system is adapted to operate in a normal mode and a fault mode. The system comprises a plurality of bridges and a plurality transformers each coupled to a respective bridge, wherein secondary windings of the transformers are coupled together. The system further comprises a plurality of dc link capacitors, each coupled across a corresponding bridge. The system further includes a controller adapted for, during the normal mode, switching each bridge with a respective normal phase shift, and, during the fault mode, switching at least one of the bridges with a respective adjusted phase shift so as to minimize harmonic components in the output voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
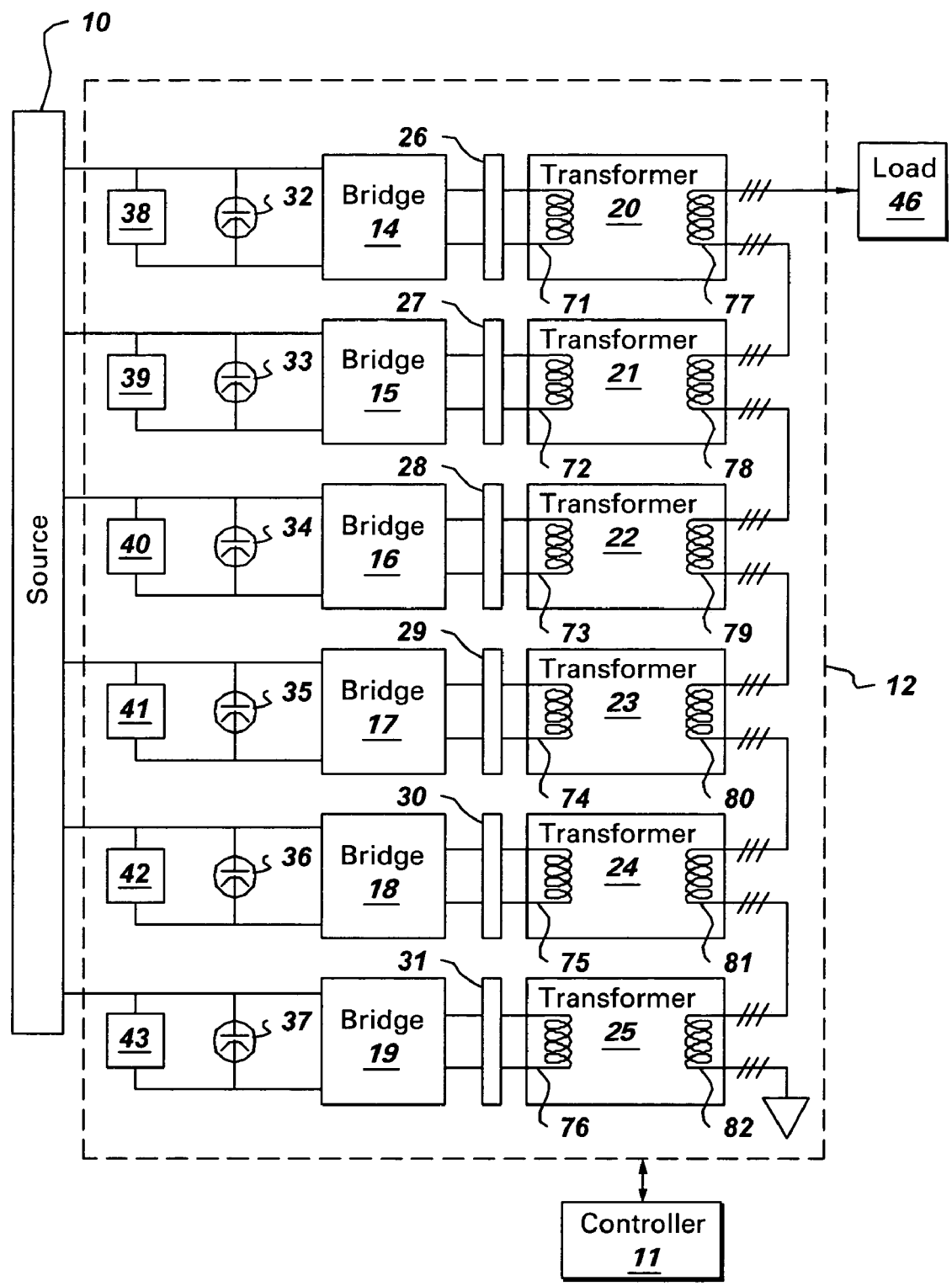
FIG. 1 is a block diagram of one embodiment of a power converter system implemented according to one aspect of the invention.

FIG. 1 is a block diagram of a power converter system implemented according to one aspect of the invention. Power converter system 12 is configured to convert dc power to corresponding ac power, which is then provided to load 46. In the illustrated embodiment, source 10 provides dc power to the power converter system. Examples of the source include electrical machines, fuel cells, a capacitor or ultra-capacitor based dc link energy storage, and batteries. Examples of loads include grids, motors, and resistive loads. Power converter system 12 is configured to operate n a normal mode and a fault mode. The power converter system 12 is described in further detail below.

As used herein, "adapted to", "configured" and the like refer to features of elements in a system which allow the elements of the system to cooperate to provide a described effect; these terms also refer to operation capabilities of electrical elements such as analog or digital computers or application specific devices (such as an application specific integrated circuit (ASIC)), amplifiers or the like that are programmed to provide an output in response to given input signals, and to mechanical devices for electrically coupling components together.

The power converter system 12 comprises bridges 14-19 and transformers 20-25. Each bridge is coupled to a primary winding 71-76 of a corresponding transformer via contactors 26-31. Secondary windings 77-82 of the transformers 20-25 are coupled in series. Controller 11 provides control signals to the power converter system to operate in a normal mode or the fault mode.

The bridges 14-19 are typically configured for switching at a pre-determined frequency and a normal phase shift to generate a corresponding bridge output voltage. The bridge output voltage includes a fundamental voltage component and harmonic components. Gating signals for the bridges are derived so that the fundamental components of the bridge output voltages are shifted in phase with respect to one another.

Transformers 20-25 are configured to generate a phase shift between the converter output voltage and the transformer secondary voltage. The phase-shifted gating signals, particularly when combined with phase shifting in the primary winding of the power converter transformers, results in canceling the low-order harmonic components from the converter output voltage. In one embodiment, the converter output voltage comprises a sum of the fundamental voltage components of each bridge output voltage. Thus, the converter output voltage is substantially free of any harmonic components. Substantially free refers to an output voltage that does not include the $5^{th}$ and $7^{th}$ order harmonic components or lower for a two-bridge configuration.

The power converter system 12 further includes a plurality of dc link capacitors 32-37. Each dc link capacitor 32-37 is coupled across a corresponding bridge 14-19 respectively. In the illustrated figure, the dc link capacitors are coupled together in series. However, it may be noted that the dc link capacitors may also be coupled in parallel or isolated from one another. Power converter system 12 further includes switching circuits 38-43. Each switching circuit is coupled across a corresponding dc link capacitor. The switching circuit is configured to discharge a corresponding dc link capacitor when the power converter system is operating in the fault mode. In one embodiment, the switching circuit comprises silicon controlled rectifiers.

The power converter system further comprises a controller 11, which is adapted for switching the power converter system between the normal mode and the fault mode. When the power converter system is operating in the normal mode, controller 11 is configured to switch each bridge 14-19 with a respective normal phase shift.

The power converter system operates in a fault mode when one of the bridges 14-19 fails. For example, if bridge 19 fails (in other words, if bridge 19 is a "faulty" bridge), controller 11 is configured provide control signals to bridges 14-18 and switching circuit 38-43 indicative of the power converter system operating in fault mode. On receiving the control signal indicating that the power converter system is operating in fault mode, bridges 14-18 switch with a an adjusted phase shift, and bridge 19 is bypassed. The phase shift is adjusted such that the harmonic components in the output voltage are at a minimum, even while operating in the fault mode. In one embodiment, the output voltage of the power converter system when operating in the normal mode is substantially equal to the output voltage of the power converter system when operating in the fault mode. In one embodiment, the output voltage of the power converter when operating in the fault mode is 83.3% of the output voltage of the power converter when operating in the normal mode. For example, in one embodiment the output voltage of the power converter system when operating in the normal mode is 4160 Volts and the output voltage of the power converter system when operating in the fault mode is 3467 Volts.

In one embodiment, the phase shift is adjusted based on a total number of bridges. In another embodiment, the phase shift is adjusted based on the total number of bypassed bridges. In a specific embodiment, the phase shift of adjacent bridges equals sixty divided by the difference between a total number of bridges and a total number of bypassed bridges.

The table below illustrates one example embodiment including six bridges and the various phase shifts at which the bridges are switched. The first row indicates the normal phase shifts corresponding to each bridge when the power converter system is operating in the normal mode. The following six rows indicate the adjusted phase shift corresponding to each bridge, when one of the bridges fails. For example, in the second row, bridge 14 has failed. Thus the phase shifts of bridges 15-19 are adjusted as shown.

TABLE 1

|  | Bridge 14 | Bridge 15 | Bridge 16 | Bridge 17 | Bridge 18 | Bridge 19 |
| --- | --- | --- | --- | --- | --- | --- |
| Normal phase shift | −5 | −25 | 15 | 5 | 25 | −15 |
| Adjusted phase shift | Fail | −23 | 13 | 1 | 25 | −11 |
| Adjusted phase shift | −7 | Fail | 17 | 5 | 29 | −19 |
| Adjusted phase shift | −3 | −27 | Fail | 9 | 21 | −15 |
| Adjusted phase shift | −1 | −25 | 11 | Fail | 23 | −13 |
| Adjusted phase shift | −5 | −29 | 19 | 7 | Fail | −17 |
| Adjusted phase shift | −9 | −21 | 15 | 3 | 27 | Fail |

The bridges, when switched with the adjusted phase shifts as shown above, minimize a root mean square (rms) value of the harmonic components. It may be noted that, the controller may be configured to switch the bridges in a way to cancel a particular order of a harmonic component. Such selective harmonic cancellation schemes allow either one or multiple orders of harmonics being eliminated from the output. The number of harmonics components eliminated depends on the number of pulses per cycle and the switching pattern.

The power converter system, when configured to operate with adjusted phase shifts for bridges 14-19, operates with the overall total harmonic distortion (THD) being minimized. The dc voltage of the remaining dc link capacitors 32-36 is dynamically balanced by equalizing the active power handled by individual bridges, which may be achieved by the control through dynamic adjustment of the magnitude and phase of each bridge output voltage.

Figure 2:
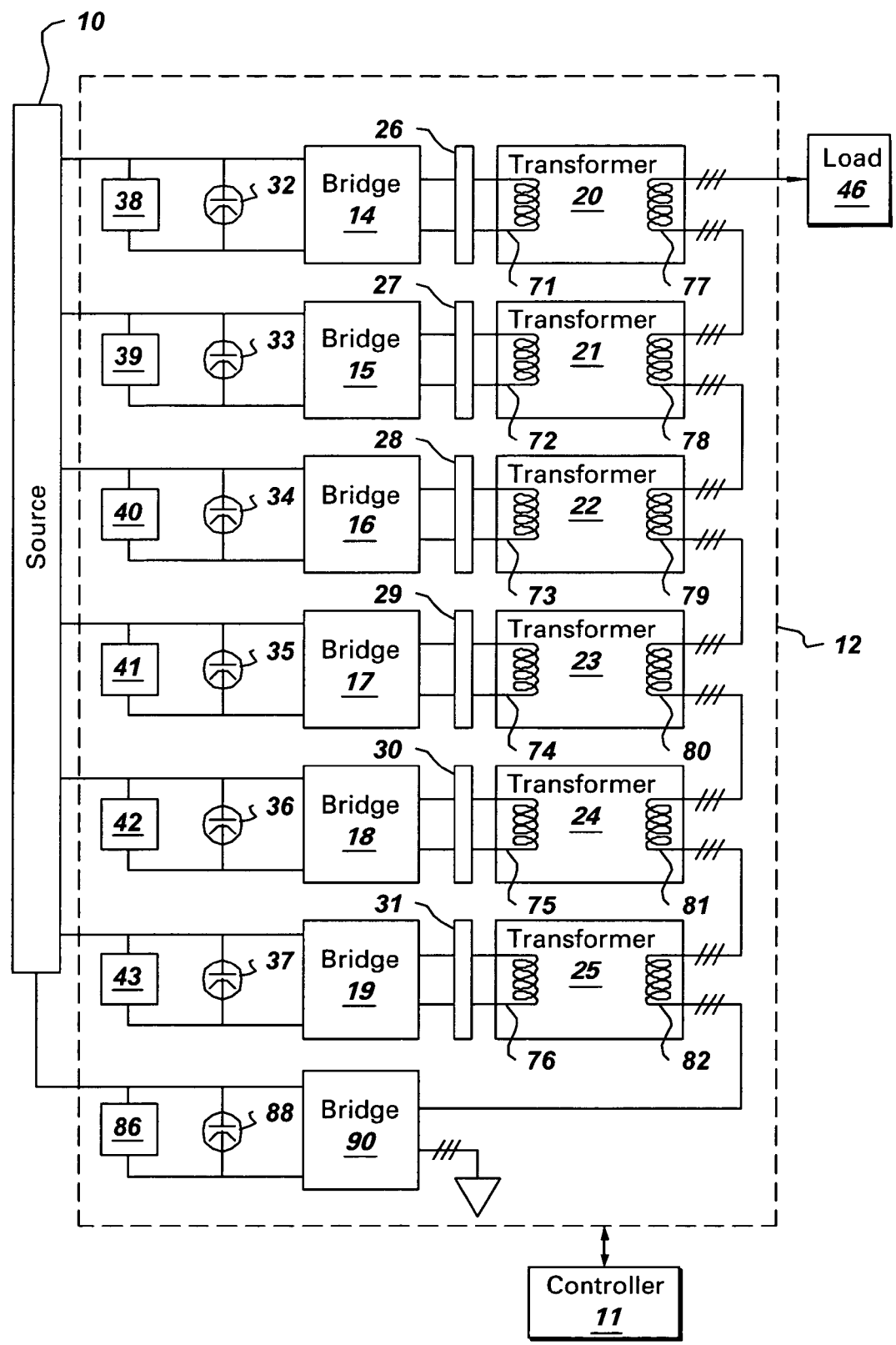
FIG. 2 is a block diagram of an alternate topology of a power converter system implemented according to one aspect of the invention.

The controller 11 may be used to provide control signals to various topologies of the power converter system. One such alternate topology is illustrated in FIG. 2, where the number of bridges is more than the number of transformers. In the illustrated figure, the power converter system 10 (as illustrated in FIG. 1) further includes a direct coupled bridge 90. The direct coupled bridge 90 is coupled to the load via the secondary winding 82 of transformer 25. Direct coupled dc link 88 is coupled across the direct coupled bridge 90 and direct coupled switching circuit 86 is coupled across the direct coupled dc link. The bridge 74, dc link capacitor and the switching circuit 70 operate in a similar manner as described with reference to FIG. 1.

Figure 3:
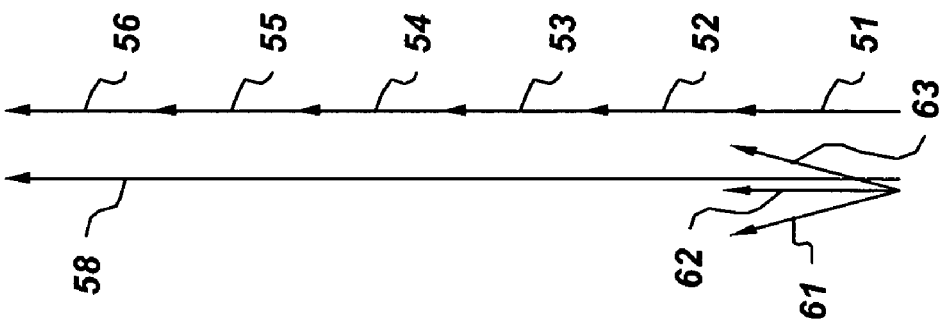
FIG. 3 is a phasor diagram illustrating the output voltage of the power converter system when operating in the normal mode.

FIG. 3 is a phasor diagram illustrating the output voltage of the power converter system when operating in the normal mode. The secondary of each transformer 20-25 has a voltage with same value and phase, represented by 51-56 respectively. The total output voltage is represented by 58, which is the sum of voltages 51-56. In one embodiment, load current 61 leads the output voltage. In another embodiment, load current 62 is in phase with the output voltage. In yet another embodiment, the load current 63 lags the output voltage.

Figure 4:
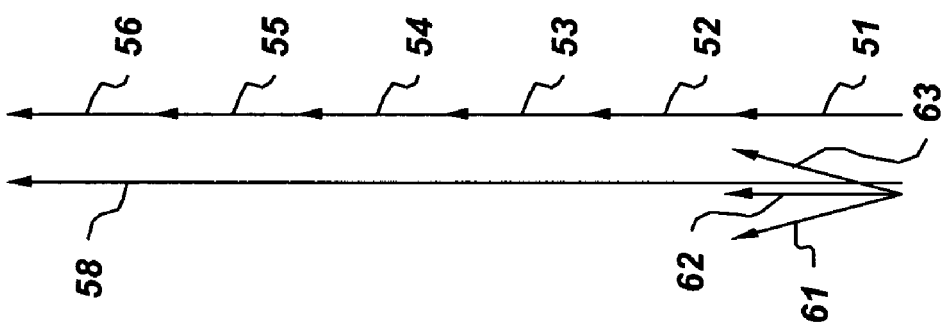
FIG. 4 is a phasor diagram illustrating the output voltage of the power converter system when operating in the fault mode without minimizing total harmonic distortion.

FIG. 4 is a phasor diagram illustrating the output voltage of the power converter system when operating in the fault mode without minimizing total harmonic distortion. In this system it is assumed that one bridge has failed. It is seen that the output voltage of the power converter system in fault mode is almost the output voltage of the power converter system in normal mode. This is because the voltage across each transformer secondary has increased by about 20%.

Figure 5:
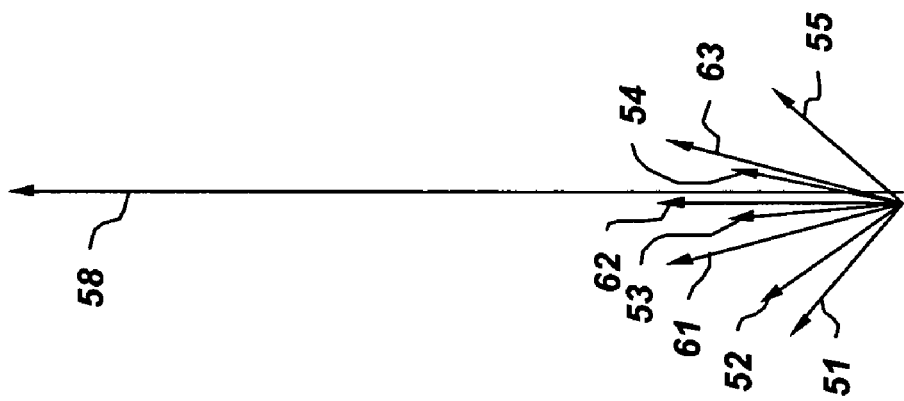
FIG. 5 is a phasor diagram illustrating the output voltage of the power converter system when operating in the fault mode while minimizing total harmonic distortion.

FIG. 5 is a phasor diagram illustrating the output voltage of the power converter system when operating in the fault mode (with one faulty bridge) while minimizing total harmonic distortion. The secondary of each transformer 77-82 has a voltage with different value and phase, represented by 51-56 respectively. These vectors are adjusted to minimize total harmonic distortion. The total output voltage represented by 58 is the sum of voltages 51-56. In one embodiment, load current 61 leads the output voltage. In another embodiment, load current 62 is in phase with the output voltage. In yet another embodiment, the load current 63 lags the output voltage.

The above-described invention provides several advantages, which include the operation of the converter system even when one bridge in the system has failed. Another advantage of one embodiment of the disclosed power converter system is that the output generated during normal mode of operation and the failure mode of operation is substantially equal. In another embodiment, the output voltage generated comprises minimum harmonic distortion even when the power converter system is operating in the failure mode.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter system for supplying an output voltage, the power converter system configured to operate in a normal mode and a fault mode, the system comprising:
   a plurality of bridges;
   a plurality transformers, wherein each bridge is coupled to a primary winding of a corresponding transformer and wherein secondary windings of the transformers are coupled together;
   a plurality of dc link capacitors, each coupled across a corresponding bridge; and
   a controller coupled to the power converter system and configured for, during the normal mode, switching each bridge with a respective normal phase shift, and, during the fault mode, bypassing at least one faulty one of the bridges and switching each of the remaining ones of the bridges with a respective adjusted phase shift to generate the output voltage.

2. The system of claim 1, further comprising a plurality of switching circuits each coupled across a corresponding dc link capacitor.

3. The system of claim 2, wherein the controller is configured to, during the fault mode, control a switching circuit corresponding to a respective faulty bridge so as to discharge a corresponding dc link capacitor.

4. The system of claim 3, wherein the controller is configured to, during the fault mode, dynamically balance dc power on the un-discharged dc links.

5. The system of claim 1, wherein the controller is configured to, during the fault mode, minimize harmonic components in the output voltage.

6. The system of claim 5, wherein the phase shift is adjusted based on a total number of bridges.

7. The system of claim 5, wherein the phase shift is adjusted based on the total number of bypassed bridges.

8. The system of claim 5, wherein difference between the phase shift of adjacent bridges equals sixty divided by the difference between a total number of bridges and a total number of bypassed bridges.

9. The system of claim 1, wherein the output voltage of the power converter system is substantially equal during the normal mode and the fault mode.

10. The system of claim 1, further comprising:
    a direct coupled bridge coupled to the load via the secondary winding of at least one transformer;
    a direct coupled dc link coupled across the direct coupled bridge; and
    a direct coupled switching circuit coupled across the direct coupled dc link.

11. A method for supplying an output voltage using a power converter system, the method comprising:
    operating in a normal mode by switching each of the bridges with a respective normal phase shift, and
    operating in a fault mode, wherein at least one of the plurality of bridges is bypassed; and the remaining bridges are each configured for being switched with an adjusted phase shift to generate the output voltage,
    wherein the power converter system comprises bridges, transformers, and dc link capacitors with each bridge being coupled to a respective transformer and having a respective dc link capacitor coupled thereacross.

12. The method of claim 11, further comprising discharging the dc link capacitor coupled across the bypassed bridge.

13. The method of claim 11, further comprising, when operating in the fault mode, dynamically balancing a dc power of the plurality of dc link capacitors.

14. The method of claim 11, further comprising maintaining a substantially equal output voltage during the normal mode and the fault mode.

15. A power converter system for supplying an output voltage, the power converter system configured to operate in a normal mode and a fault mode, the system comprising:
    a plurality of bridges;
    a plurality transformers each coupled to a respective bridge via a corresponding ac contactor, wherein secondary windings of the transformers are coupled together;
    a plurality of dc link capacitors, each coupled across a corresponding bridge; and
    a controller coupled to the power system converter and configured for, during the normal mode, switching each bridge with a respective normal phase shift, and, during the fault mode, switching at least one of the bridges with a respective adjusted phase shift so as to minimize harmonic components in the output voltage.

16. The system of claim 15, further comprising a plurality of switching circuits each coupled across a corresponding dc link capacitor; wherein the controller is configured to cause a specific switching circuit to discharge a corresponding dc link capacitor when the power converter system is operating in the fault mode.

17. The system of claim 16, wherein during the fault mode, the controller is configured to cause the switching circuit to bypass the corresponding dc link capacitor and to activate the ac contactor to bypass the corresponding transformer.

18. The system of claim 17, wherein the controller is configured to, during the fault mode, dynamically balance dc power on the un-discharged dc links.

19. The system of claim 15, wherein the output voltage of the power converter system is substantially equal during the normal mode and the fault mode.

* * * * *